United States Patent [19]

Antoon, Jr.

[11] Patent Number: 5,045,331

[45] Date of Patent: Sep. 3, 1991

[54] CONTAINER FOR CONTROLLED ATOMSPHERE PACKAGING

[75] Inventor: Mitchell K. Antoon, Jr., Wilmington, Del.

[73] Assignee: Hercules Incorporated, Wilmington, Del.

[21] Appl. No.: 175,468

[22] Filed: Mar. 30, 1988

Related U.S. Application Data

[63] Continuation-in-part of Ser. No. 87,855, Aug. 14, 1987, abandoned.

[51] Int. Cl.$^5$ .................. A23B 7/148; B65D 85/50; B65D 81/20
[52] U.S. Cl. .................. 426/118; 426/106; 426/415; 426/419
[58] Field of Search .............. 426/419, 415, 118, 395, 426/396, 106; 47/84

[56] References Cited

U.S. PATENT DOCUMENTS

| | | | |
|---|---|---|---|
| 2,611,709 | 9/1952 | Plagge | 426/419 |
| 3,102,777 | 9/1963 | Bedrosian et al. | 426/419 |
| 3,423,212 | 1/1969 | Purcell et al. | 426/415 |
| 3,450,542 | 6/1969 | Badran | 426/419 |
| 3,450,543 | 6/1969 | Badran et al. | 426/415 |
| 3,450,544 | 6/1969 | Badran et al. | 426/415 |
| 3,507,667 | 4/1970 | Magnen | 426/419 |
| 3,630,759 | 12/1971 | Rumberger | 426/415 |
| 3,795,749 | 3/1974 | Cummin et al. | 426/415 |
| 3,798,333 | 3/1974 | Cummin et al. | 426/415 |
| 3,804,961 | 4/1974 | Cummin et al. | 426/415 |
| 4,079,152 | 3/1978 | Bedrosian et al. | 426/415 |
| 4,209,538 | 6/1980 | Woodruff | 426/419 |
| 4,224,347 | 9/1980 | Woodruff | 426/419 |
| 4,423,080 | 12/1983 | Bedrosian et al. | 426/415 |
| 4,485,133 | 11/1984 | Ohtsuka et al. | 426/124 |
| 4,487,791 | 12/1984 | Komatsu et al. | 406/124 |
| 4,515,266 | 5/1985 | Myers | 426/419 |
| 4,769,262 | 9/1988 | Ferrar et al. | 426/419 |

FOREIGN PATENT DOCUMENTS

| | | | |
|---|---|---|---|
| 0178218 | 4/1986 | European Pat. Off. | 426/106 |
| 2033541 | 4/1970 | France | 426/410 |
| 1590579 | 5/1970 | France | 426/419 |
| 2531042 | 2/1984 | France | 426/118 |
| 4717187 | 5/1972 | Japan | 426/419 |
| 538781 | 3/1978 | Japan | 426/415 |
| 5610459 | 2/1981 | Japan | 426/106 |
| 740190 | 6/1980 | U.S.S.R. | 426/419 |
| 829484 | 5/1981 | U.S.S.R. | 426/106 |

OTHER PUBLICATIONS

Package Engineering 8/74, p. 51.
Modern Packaging 6/48, pp. 163–165.
Modern Packaging vol. 40, #2 (1966), pp. 169–172, 254.
Encyclopedia of Polymer Science and Technology, vol. 9, John Wiley & Sons, 1968, "Permeability", pp. 794–795.
"Standard Method for Determining Gas Permeability Characteristics of Plastic Film and Sheeting", ASTM D1434-82, 1987, Amend Book of ASTM Standards, vol. 08.01, pp. 611–619, 622–626.

*Primary Examiner*—Steven Weinstein
*Attorney, Agent, or Firm*—David Edwards

[57] ABSTRACT

A container for storage of fruits or vegetables wherein the optimum environment, i.e., the optimum carbon dioxide to oxygen ratio, for the storage of said fruits or vegetable can be attained and maintained, thereby retarding maturation and spoilage thereof. The environment is controlled by providing a resin-coated nonwoven panel of limited carbon dioxide and oxygen permeability on an otherwise substantially impermeable container. The size of this panel is a function of its permeability, the amount and respiration rate of the contents, and the ratio of carbon dioxide of oxygen desired.

4 Claims, 1 Drawing Sheet

CONTAINER FOR CONTROLLED ATOMSPHERE PACKAGING

This is a continuation-in-part of application Ser. No. 087,855, filed Aug. 14,1987, now abandoned.

BACKGROUND OF THE INVENTION

This invention relates to the controlled atmosphere storage of fresh fruits, vegetables and flowers, and specifically to a method of packaging and a package, that controls the atmosphere surrounding the packaged fruit, vegetable or flower product to improve retention of product freshness.

Maintaining the flavor, texture and eating qualities of fresh fruits and vegetables, and extending the shelf life of flowers (hereinafter "produce" collectively) from the time of harvest through the time of consumption has long been a serious problem. The most commonly used technique has been refrigeration. Some items, such as tomatoes, bananas and citrus fruits, are routinely picked in a less-than-ripe condition and are stored at reduced temperatures until they are sold. Other products, such as grapes and lettuce, are picked at maturity and refrigerated. The reduced temperature helps to retard further ripening, but only for relatively short time periods and, for some produce items, is detrimental to the keeping quality of the product after it is exposed to room temperature.

The maturation of produce is a complex series of biochemical and developmental changes. Among the most important processes is respiration, which generally takes place according to the equation:

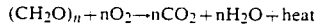

$$(CH_2O)_n + nO_2 \rightarrow nCO_2 + nH_2O + heat$$

wherein $(CH_2O)_n$ represents a carbohydrate molecule that is oxidized as the produce respires during maturation on storage. For each produce type, there is an optimum range of concentrations of $CO_2$ and $O_2$ at which its respiration is retarded and quality is improved to the greatest extent. For instance, some produce benefit from relatively high levels of $CO_2$, e.g., strawberries and mushrooms, while others such as lettuce and tomatoes, store better at lower levels of $CO_2$.

It is known that this process of respiration can be reduced by controlling the atmosphere surrounding the produce so that an optimum $O_2$ range and relative concentration of $CO_2$ to $O_2$ are maintained. For instance, U.S. Pat. No. 3,102,777 discloses storage of produce in a container which is continuously replenished to maintain a higher level of carbon dioxide than in air. U.S. Pat. No. 3,450,542, discloses packaging bananas in bags of polyethylene film that have a greater permeance to carbon dioxide than to oxygen; the volume of air in the package is reduced to leave relatively little oxygen and an appropriate balance between the $CO_2$ produced and $O_2$ consumed by the produce and the relative flows of the two gases through the film is produced and maintained for an appropriate storage period (up to about 28 days). However, it is a serious disadvantage that the fixed ratios of permeance involved limit the control of the atmospheric composition.

The published paper "Controlling Atmosphere in a Fresh Fruit Package" by P. Veeraju and M. Karel, Modern Packaging, Vol. 40, #2 (1966) pages 169–172, 254, partly overcomes that limitation by using variable-sized panels of polyethylene or permeable parchment paper in the walls of an otherwise impermeable package to establish a controlled atmosphere, and shows experimentally-derived calculations to determine the panel sizes that are appropriate for different respiration rates of produce. However, predictable areas of panels based on known respiration rates had to be replaced by variable values calculated for individual situations, and problems were encountered with the use of film, requiring excessive areas of permeable panels (over 258 cm$^2$ (40 in.$^2$)) or the use of paper, which is undesirably wettable.

As indicated, the most advanced known controlled atmosphere storage techniques are not entirely satisfactory. There is a need for containers for packaging produce in which the atmosphere can be predictably controlled at approximately the point required to retard the ripening process and retain product freshness, while permitting the use of panels having an area of the order of 25.8 cm$^2$ (4 in.$^2$) or less, which can easily be so situated that they are not likely to be blocked by other containers in stacking or handling. The area and permeance required are independently and directly dependent on the weight of produce enclosed.

SUMMARY OF THE INVENTION

This invention is directed to a container constructed of a substantially gas impermeable material having, on one or more of the surfaces thereof, a panel of a nonwoven material coated with a water resistant resin which provides a gas flux comprising the majority of the gas flux through the container. The materials used to coat the panel(s), the areas of the panel(s), and the relationship of the panel area to the total container surface area and volume are chosen in conjunction with the produce respiration rate such that the combination of the total flux through the panel and the produce respiration rate provides dynamic control of the atmosphere inside the container.

Stated more specifically, the invention is directed to a container capable of creating within it a preselected carbon dioxide and oxygen concentration in the presence of respiring fresh fruit, vegetable or flowers, that is constructed of a substantially gas-impermeable material having a gas-permeable panel in one or more of its walls to provide a controlled flow or flux of $CO_2$ and $O_2$ through its walls, where the panel is a resin-coated nonwoven material having a permeance ratio of carbon dioxide to oxygen between about 1 to 1 and 8 to 1 and having a permeance between about 5,000 and 30,000,000 cc/100 sq. in./day/atmosphere, the permeance and area of the panel being such as to provide a flux of $O_2$ approximately equal to the predicted $O_2$ respiration rate for not more than 3.0 kg. of enclosed fruit, vegetable or flower and the carbon dioxide permeance of the membrane being such as to maintain the desired optimum ranges of carbon dioxide and oxygen for not more than the said 3.0 kg. of enclosed produce.

DESCRIPTION OF THE PREFERRED EMBODIMENT

Figure 1:
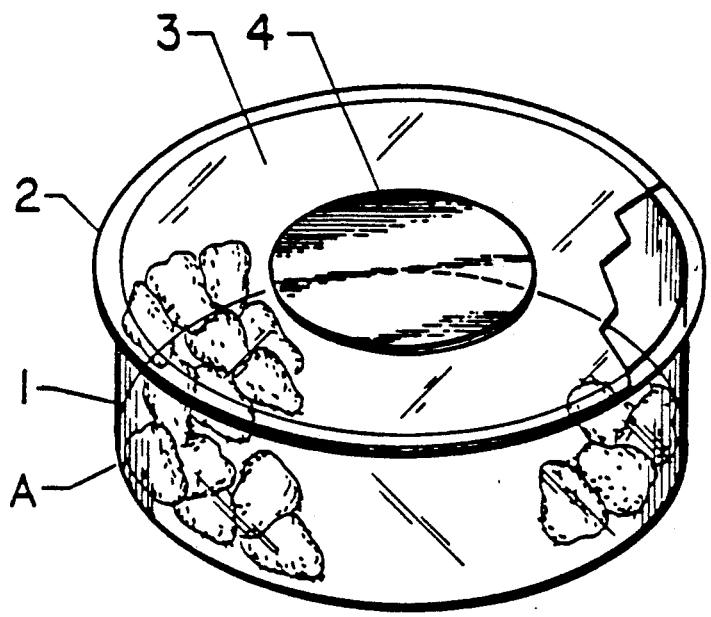
FIG. 1 is a perspective view of a container having a panel according to this invention.

In the following description, the units applied to the terms used in reference to the flow of a particular gas through a film are "flux", expressed as cc/day, and "permeance" expressed as cc/m²-day-atmosphere. The "permeability constant" of a particular film is expressed as cc-mm/m²-day-atmosphere. (The values are converted from U.S. usage, from which mils and 100 in² are replaced by mm and m² to give the above units. In the pressure units, one atmosphere is 101,325 Pa; they define the partial pressure differences or permeation "driving forces" on opposite sides of the film involving the $CO_2$ or $O_2$ gases involved).

Permeance is measured with an apparatus that employs gas pressure ranging from 6.895 to 206.9 kPa (1 to 30 psi) as the driving force and a mass flow meter to measure the gas flow or flux through the membrane.

The panel in the container of the instant invention is a resin-coated nonwoven fibrous material having an oxygen-permeance between about 77,500 and 465,000,000 cc/m²-day-atmosphere (5,000 and 30,000,000 cc/100 in²-day-atmosphere). Preferably, the gas-permeable panel is a silicone-coated paper having a permeance between about 310,000 and 13,950,000 cc/m²-day-atmosphere (20,000 and 900,000 cc/100 in²-day-atmosphere) for produce weighing in the normal range for retail packaging (less than one kg.) (2.2 lb.). For normal institutional or food-service packaging with higher unit produce weights, the area and permeance of the panel can be increased as required.

Another example of a gas-permeable panel that can be used in this invention is a nonwoven fibrous material, such as paper, coated with an ink dispersion containing a film-forming resin, such as butadiene-styrene copolymers.

More preferably, in a container according to the invention, to predictably control the atmosphere surrounding the packaged fruit or vegetable product, the permeance and area of the membrane panel is such as to provide a flux of $O_2$ approximately equal to the predicted $O_2$ respiration rate of not more than 3.0 kg. (6.6 lb.) of enclosed fruit, vegetable or flower, and the carbon dioxide permeance of the membrane being such as to maintain the desired optimum ranges of carbon dioxide and oxygen for not more than the said 3.0 kg. (6.6 lb.) of enclosed produce.

The following table records respiration rates and optimum storage conditions for several popular types of produce:

TABLE 1

| | Respiration Rate* | | Desired Atmosphere (Vol %) | |
|---|---|---|---|---|
| | 4° C. | 21° C. | $O_2$ | $CO_2$ |
| Lettuce, head | 8.5 | 28 | 1–5 | 0 |
| Tomato, mature-green | 3.4 | 18 | 3–5 | 0–3 |
| Banana, ripening | | 44 | 2–5 | 2–5 |
| Avocado | 13 | 107 | 2–5 | 3–10 |
| Peach | 3.9 | 41 | 1–2 | 5 |
| Cherry, sweet | 6.0 | 15 | 3–10 | 10–12 |
| Strawberry | 13 | 76 | 10 | 15–20 |
| Asparagus | 42 | 113 | 21 | 5–14 |
| Mushroom | 36 | 148 | 6–10 | 10–15 |
| Broccoli (main stems + florets) | 50 | 158 | 1–2 | 5–10 |

*Ref: USDA Handbook 66; assume rate @ normal atmosphere. Rate is cc of $O_2$ per kg per hr.

Taking into consideration the respiration characteristics of the produce to be packaged and the optimum $CO_2$ and $O_2$ ranges required to retard its maturation, it is possible to design a container for packaging any produce in substantially any quantity. The produce respiration coefficient is defined as the $CO_2$ respiration rate divided by the $O_2$ respiration rate for the produce item.

The ability to control the atmosphere within the container is derived not only from the ability to adjust the area of the resin-coated nonwoven fibrous panel that allows communication between the interior and exterior of the container, but also from the ability to select the permeance of the panels to adapt to a variety of produce. Virtually all nonwoven materials are somewhat permeable by oxygen or carbon dioxide, as shown by known atmosphere-limiting packaging systems, and they may have $CO_2/O_2$ permeance ratios of 1/1 and higher. However, the panel must be selected to have a permeance sufficient to allow the type of control required within a reasonable time and an area suitable for the amount of produce being packaged.

Since the panel size required varies inversely with its permeance, panels with excessively great permeance, that is, greater than about 465,000,000 cc/m²-day-atmosphere (30,000,000 cc/100 in²-day-atmosphere), may have to be so small that they would be difficult to install in a package. If the permeance is less than about 77,500 cc/m²-day-atmosphere (5,000 cc/100 in²-day-atmosphere), the size of the panel may be so large as to be greater than the practical size of the container.

A preferred panel for use in this invention has a permeance of about 5,000 to 30,000,000 and preferably 20,000 to 900,000 and most preferably about 20,000 to 200,000 cc/100 sq. in./day/atmosphere.

Additionally, panels of any $CO_2/O_2$ permeance ratio between about 1:1 and 8:1, preferably 1:1 to 4:1, can be used. The selectivity, along with the produce respiration and panel permeance and panel area (note that permeance times thickness is permeability), determines the gas composition attained in the container.

Figure 2:
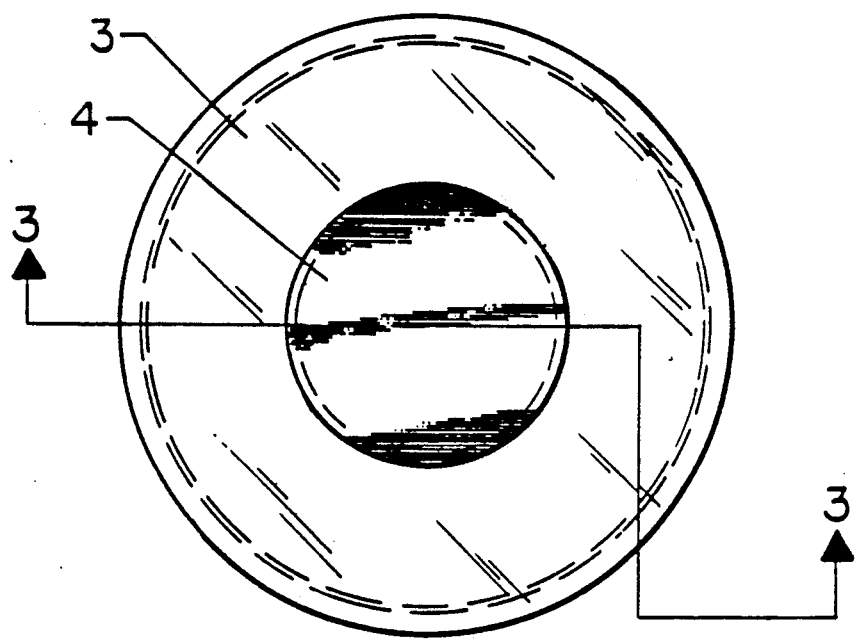
FIG. 2 is a plan view of the same container.
Figure 3:
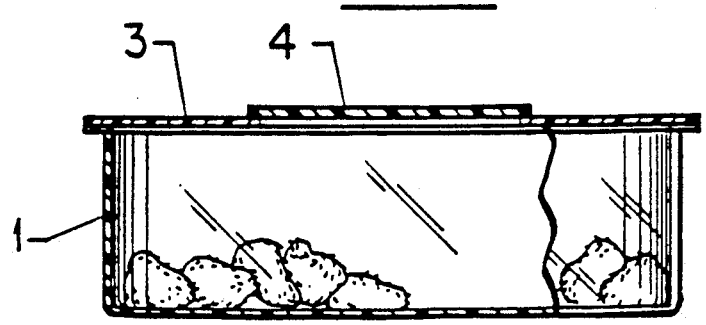
FIG. 3 is a section view along line 3—3.

The controlled atmosphere container shown in FIGS. 1 to 3 consists of a container A comprising a substantially impermeable body portion 1 and a lid 2 comprising a solid substantially impermeable area 3 and a permeable control panel 4. Although the panel is located on the lid in the embodiment shown, it could be located at any point on the package where it will not be covered by other containers when it is stacked or packed for shipment.

The container can be of any required size, e.g., from as little as 100 cc up to several liters or more. The material of construction of the container is not critical so long as the entire container is impermeable to moisture and substantially impermeable to air except in the control panel area. By "substantially impermeable" is meant a permeance so low that, if the container is sealed with produce inside (without any permeable panel), the oxygen in the container will be completely exhausted or the oxygen level will equilibrate at such a low level that anaerobic deterioration can occur. Thus glass, metal or plastic can be employed. Plastic materials such as heavy gauge polyolefins, poly(vinyl chloride), or polystyrene are preferred. The plastic materials exhibit substantial impermeability due to their thickness, but in some cases their permeability may be sufficient to be taken into account when sizing the panel.

Control of the atmosphere within the container is achieved by proper sizing of the permeable control panel relative to the mass of produce, the free gas space within the filled container, the respiration rate of the produce and the permeability characteristics, i.e., flux rate and $CO_2/O_2$ selectivity ratio of the container and the permeable panel. If the proper relationship among these variables is achieved, a steady state at the correct $CO_2/O_2$ ratio can be reached within about one to three days depending on the unfilled volume of the container and the respiration rate of the produce. Simple laws of physics explain this phenomenon.

Oxygen in the container is consumed by the produce as it respires. An approximately equal amount of carbon dioxide is generated. The reduction in oxygen concentration and buildup of carbon dioxide concentration creates a driving force for oxygen to enter and carbon dioxide to exit the container according to the equation:

$$\text{Flux across film} = \frac{\text{Permeability} \times \text{Area}}{\text{Thickness}} \times (\text{Driving Force})$$

where the driving force is the difference in the gas concentrations within the container and in the room air.

Initially the driving force is low and the flux across the film is not sufficient to replace the oxygen that is consumed and drive out all of the carbon dioxide that is generated. Thus, inside the container the oxygen content decreases and the carbon dioxide content increases. The decrease in oxygen in the container also causes a decrease in the produce respiration rate. As the produce continues to respire, oxygen is consumed, carbon dioxide is generated, respiration rate decreases and the driving forces to replace the oxygen and drive out the carbon dioxide increase. Thus, the fluxes of oxygen and carbon dioxide through the film increase. The combination of these processes proceeds to the point where the consumption of oxygen is equal to the replacement of oxygen in the container by permeation through the panel. At this point, steady state is reached. The approach to steady state starting with room air is demonstrated by the data in Tables 2 and 3.

The data in Tables 2 and 3 are calculated using the following assumptions:

Produce wt. —1 lb.
Free air space —425 cc
Produce respiration rate —12.8 cc of $O_2$/kg/hr
Area of panel —1.5 sq. in.
$O_2$ permeance—20,000 cc/100 sq. in./atm./day
$CO_2$ permeance—20,000 cc/100 sq. in./atm./day
Produce respiration coefficient = 1.0

TABLE 2

| Time Interval hr. | | Oxygen Consumed cc | Oxygen in Container[a] cc | Oxygen in Container[a] % | Average Driving Force[b] $10^{-3}$ atm | Oxygen Permeated into Container[c] cc |
|---|---|---|---|---|---|---|
| 0 | 0.5 | 2.86 | 86.4 | 20.32 | 3.4 | 0.02 |
| 0.5 | 1.0 | 2.76 | 83.6 | 19.68 | 10.0 | 0.06 |
| 10 | 10.5 | 1.65 | 50.2 | 11.82 | 90.5 | 0.57 |
| 20 | 20.5 | 1.19 | 36.4 | 8.56 | 123.9 | 0.77 |
| 30 | 30.5 | 1.01 | 31.1 | 7.31 | 136.7 | 0.85 |
| at steady state | | 0.91 | 27.9 | 6.56 | 144.4 | 0.90 |

[a] Oxygen at end of the time interval.

[b] Driving force = $0.21 - \left( \frac{\% \text{ Oxygen in Container} \cdot \text{Pressure in Container}}{100} \right)$

[c] Oxygen permeated through the film during the time interval. Pressure in container 1 atmosphere.

TABLE 3

| Time Interval hr. | | Carbon Dioxide Generated cc | Carbon Dioxide in Container[a] cc | Carbon Dioxide in Container[a] % | Average Driving Force[b] $10^{-3}$ atm | Carbon Dioxide Permeated Out of Container[c] cc |
|---|---|---|---|---|---|---|
| 0 | 0.5 | 2.86 | 2.9 | 0.68 | 3.4 | 0.02 |
| 0.5 | 1.0 | 2.76 | 5.6 | 1.32 | 10.0 | 0.06 |
| 10 | 10.5 | 1.65 | 39.1 | 9.19 | 90.6 | 0.57 |
| 20 | 20.5 | 1.19 | 53.0 | 12.47 | 124.2 | 0.78 |
| 30 | 30.5 | 1.01 | 58.3 | 13.72 | 137.1 | 0.86 |
| at steady state | | 0.91 | 61.6 | 14.50 | 145.0 | 0.91 |

[a] Carbon dioxide at end of the time interval.

[b] Driving force = $\left( \frac{\% \text{ Carbon Dioxide in Container} \cdot \text{Pressure}}{100} \right)$

[c] Carbon dioxide permeated through the film during the time interval. Pressure in container 1 atmosphere.

In this illustration, the time to steady state is on the order of 40 to 50 hours. Shorter times can easily be achieved by either prepurging the container with the final desired gas composition or decreasing the free gas space by package design, as is demonstrated by the following explanation.

If the preferred permeability ratio of 1/1 is used, the sum of the $CO_2$ and $O_2$ concentrations, in volume percent, will always be 21%. This is because, as one mole of oxygen is consumed, one mole of carbon dioxide is generated; the driving forces for oxygen replacement and carbon dioxide expulsion are always equal and the nonwoven panel allows equal portions of each gas to permeate.

If a $CO_2/O_2$ permeability ratio greater than 1/1 is used, the sum of the $CO_2$ and $O_2$ concentrations, in volume percent, will always be less than 21% since more carbon dioxide than oxygen will permeate. The sum can be determined once the variables affecting it are specified, such as $CO_2$ and $O_2$ panel permeances, area, $CO_2/O_2$ separation ratios, and produce weight.

The panels used in the containers of this invention are made of a resin coated nonwoven material. The term nonwoven material is intended to include nonwoven textile fabrics based on polypropylene, polyester, or other synthetic fiber-forming material, paper such as parchment or glassine, and synthetic pulps such as spurted polyolefin fibers in sheet form. With the exception of some types of paper, the non-woven materials are usually too permeable to oxygen and carbon dioxide to be effective as the panel and thus must be treated with an application of a water resistant resin which reduces the open pore space in the fabric to such a degree that its permeance is reduced into the useful range. In some instances, the coating can create a continuous film over the pores, which is thin enough to have the correct permeance. In any event, the amount of the resin applied can be selected so as to regulate the permeance of the panel.

Since the produce respiration process produces water, it is important that the coating resin be water resistant. Also, in the case where the panel is made of paper, even though the paper may in some cases have such a permeance that it could be employed per se, it will absorb water and lose its integrity rather rapidly. Thus, a second reason exists for the resin to be water resistant.

The preferred material for use as the permeable panel in the containers of the invention is a silicone coated paper. A silicone coated paper having an oxygen permeance of about 94,000 to 2.8 million cc/100 sq. in./atmosphere/day is commercially available.

Silicone resins employed as coatings useful in this invention are preferably cross-linked polyalkyl siloxanes having the structural formula:

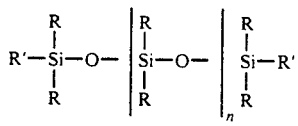

where n is about 3 to 3,000, R is a lower alkyl group and R' is hydrogen, hydroxyl, acetoxy, vinyl, or alkylamino. Preferred silicones are poly(dimethylsiloxanes) where n is about 6 to 1,000.

Other resins which can be employed include styrene butadiene copolymers, acrylic polymers, polyvinyl acetate, and vinyl chloride polymers and copolymers. Such resins can be applied to the panel substrate as such, or, as they are frequently employed as the film formers in certain types of ink, they can be applied from an ink dispersion.

The following examples were carried out using a prototype CAP device comprised of a glass vessel having a hermetically sealable lid with an opening of a preselected size therein. This opening was covered with a panel of the material to be tested. The device was also fitted with a tap for taking samples of the atmosphere within the device.

EXAMPLE 1

Mushrooms (Specimen A) (253.2 g) were placed in a tightly-sealed glass vessel held at 4° C. in a refrigerator. The internal atmosphere of the vessel communicated with the external atmosphere only through the pores of a silicone-treated paper film which covered a 4 sq. in. aperture in the top of the glass vessel. The silicone treated film was protected from moisture condensation by a layer of dessicant. The silicone-treated paper, Release Paper SBL 425C manufactured by Akrosil Div. of International Paper Co., had oxygen and carbon dioxide permeances of 293,800 and 305,000 cc/100 sq. in./atmosphere/day, respectively. The initial gas composition in the vessel consisted of about 21% by volume oxygen, about 0.03% carbon dioxide, and about 78% nitrogen.

A second batch of mushrooms (Specimen B) was placed in a similar container wherein the permeable coated paper panel was replaced by an impermeable plastic lid.

A third batch of mushrooms (Specimen C) was stored in open air.

The atmosphere in the containers was sampled over a 7 day period using a gas chromatography syringe. Oxygen and carbon dioxide were determined with a gas chromatograph. One day after storage the atmosphere in Specimen A was 12% oxygen and 6% carbon dioxide and after 3 days the atmosphere had reached a steady state at 10% oxygen and 10% carbon dioxide. The gas composition in the Specimen B environment was 2.5% oxygen and 15% carbon dioxide after one day and reached steady state at 1% oxygen and 20% carbon dioxide after three days.

At the end of 7 days, Specimen A mushrooms were white in color, had no off odor and were considered edible. Specimen B mushrooms were white in color and had no off odor, but were considered inedible due to the essentially anaerobic condition in this environment; and Specimen C mushrooms were brown, pitted and dehydrated and inedible.

EXAMPLE 2

Fresh, whole mushrooms (about 150 g) were stored at 4° C. in a glass container having a permeable silicone-treated release paper (Akrosil 80SC Silox lu/4u, manufactured by International Paper) placed over a 4 sq. inch opening in the lid. The release paper had an oxygen permeance of 94,300 cc/100 sq. in./atomosphere/day and a carbon dioxide permeance of 130,000 cc/100 sq. in./atmosphere/day. Oxygen and carbon dioxide levels in the container were determined over a 7 day period using gas chromatographic techniques. After one day the gas composition in the container was 16% oxygen and 4% carbon dioxide. In three days the oxygen concentration decreased to 14% and the carbon dioxide concentration increased to 7%. After 7 days quality evaluations of the mushrooms indicated that they had maintained their white color and were considered edible.

What is claimed is:

1. A container for retarding the maturation of respiring fresh produce selected from the group consisting of fruit, vegetables, or flowers contained therein by creating within the container a preselected, controlled carbon dioxide and oxygen concentration in the presence of said respiring fresh fruit, vegetables or flowers, said container being constructed of a substantially gas-impermeable material completely enclosing said produce and having a gas-permeable panel in one or more of its walls to provide a controlled flow or flux of $CO_2$ and $O_2$ through its walls, wherein the panel is a silicone or butadiene-styrene copolymer coated nonwoven fibrous material having a permeance ratio of carbon dioxide to oxygen between about 1 to 1 and 8 to 1 and having an oxygen permeance between about 5,000 and 30,000,000 cc/100 sq. in./day/atmosphere, the permeance and area of the permeable panel being such as to provide a flux of $O_2$ approximately equal to the predicted $O_2$ respiration rate for not more than 3.0 kg. of the enclosed fruit, vegetable or flower, and the carbon dioxide permeance of the panel being such as to maintain the desired optimum ranges of carbon dioxide and oxygen sufficient for optimum retardation of the maturation process of said produce for not more than the said 3.0 kg. of enclosed produce.

2. The container of claim 1 wherein the permeable 20 control panel is a silicone-coated paper.

3. The container of claim 1 wherein the permeable control panel is paper coated with a butadiene-styrene copolymer.

4. The container of claim 1 where the permeable control panel is paper coated with an ink dispersion containing a film-forming resin selected from butadiene-styrene copolymers.

* * * * *